(12) United States Patent
Sattler et al.

(10) Patent No.: US 7,908,589 B2
(45) Date of Patent: Mar. 15, 2011

(54) DEPLOYMENT

(75) Inventors: Juergen Sattler, Wiesloch (DE);
Joachim Fitzer, Schriesheim (DE);
Rainer Brendle, Neckargemund (DE)

(73) Assignee: SAP AG, Walldorf (DE)

( * ) Notice: Subject to any disclaimer, the term of this patent is extended or adjusted under 35 U.S.C. 154(b) by 1139 days.

(21) Appl. No.: 11/512,440

(22) Filed: Aug. 29, 2006

(65) Prior Publication Data
US 2008/0127084 A1    May 29, 2008

(51) Int. Cl.
*G06F 9/44*    (2006.01)

(52) U.S. Cl. ......... 717/121; 717/169; 717/172; 717/175; 717/177; 709/203; 709/223

(58) Field of Classification Search ................. 717/121, 717/172, 177, 169, 175; 709/200, 203, 223
See application file for complete search history.

(56) References Cited

U.S. PATENT DOCUMENTS

| | | |
|---|---|---|
| 4,079,452 A | 3/1978 | Larson et al. |
| 4,501,528 A | 2/1985 | Knapp |
| 5,307,499 A | 4/1994 | Yin |
| 5,459,868 A | 10/1995 | Fong |
| 5,680,624 A | 10/1997 | Ross |
| 5,754,845 A | 5/1998 | White |
| 5,758,062 A | 5/1998 | McMahon et al. |
| 5,857,102 A | 1/1999 | McChesney et al. |
| 5,978,579 A | 11/1999 | Buxton et al. |
| 6,044,461 A | 3/2000 | Agha et al. |
| 6,067,525 A | 5/2000 | Johnson et al. |
| 6,128,730 A | 10/2000 | Levine |
| 6,161,123 A | 12/2000 | Renouard et al. |
| 6,161,176 A | 12/2000 | Hunter et al. |
| 6,185,587 B1 | 2/2001 | Bernardo et al. |
| 6,189,139 B1 | 2/2001 | Ladd |
| 6,230,305 B1 | 5/2001 | Meares |
| 6,301,710 B1 | 10/2001 | Fujiwara |
| 6,324,578 B1 * | 11/2001 | Cox et al. ...................... 709/223 |
| 6,397,232 B1 | 5/2002 | Cheng-Hung et al. |
| 6,449,624 B1 | 9/2002 | Hammack et al. |
| 6,453,302 B1 | 9/2002 | Johnson et al. |
| 6,466,972 B1 | 10/2002 | Paul et al. |
| 6,470,464 B2 | 10/2002 | Bertram et al. |
| 6,513,045 B1 | 1/2003 | Casey et al. |
| 6,523,027 B1 | 2/2003 | Underwood |
| 6,538,668 B1 | 3/2003 | Ruberg et al. |

(Continued)

FOREIGN PATENT DOCUMENTS

JP    2004287972 A    10/2004

(Continued)

OTHER PUBLICATIONS

Title:Reducing Complexity of Software Deployment with Delta Configuration, author: Ganguly et al, source: IEEE, dated: May 21, 2007.*

(Continued)

*Primary Examiner* — Chameli C Das
(74) *Attorney, Agent, or Firm* — Schwegman, Lundberg & Woessner, P.A.

(57) ABSTRACT

The inventive subject mater relates to software application configuration and, more particularly, deployment of a software application configuration. Various embodiments provide systems, methods, and software that configure an application in an application configuration environment and deploying configuration settings from the configuration environment to an application execution environment.

17 Claims, 6 Drawing Sheets

U.S. PATENT DOCUMENTS

| | | | |
|---|---|---|---|
| 6,539,372 B1 | 3/2003 | Casey et al. | |
| 6,728,877 B2 | 4/2004 | Mackin et al. | |
| 6,763,327 B1 | 7/2004 | Songer et al. | |
| 6,804,709 B2 | 10/2004 | Manjure et al. | |
| 6,810,401 B1 | 10/2004 | Thompson et al. | |
| 6,868,392 B1 | 3/2005 | Ogasawara | |
| 7,031,951 B2 | 4/2006 | Mancisidor et al. | |
| 7,032,114 B1 | 4/2006 | Moran | |
| 7,062,502 B1 | 6/2006 | Kesler | |
| 7,089,317 B2 * | 8/2006 | Jeyaraman et al. | 709/230 |
| 7,099,945 B2 * | 8/2006 | Lugger et al. | 709/227 |
| 7,181,731 B2 * | 2/2007 | Pace et al. | 717/136 |
| 7,206,827 B2 | 4/2007 | Viswanath et al. | |
| 7,228,326 B2 * | 6/2007 | Srinivasan et al. | 709/200 |
| 7,283,816 B2 | 10/2007 | Fok et al. | |
| 7,299,382 B2 | 11/2007 | Jorapur | |
| 7,337,317 B2 | 2/2008 | Meggitt et al. | |
| 7,340,411 B2 | 3/2008 | Cook | |
| 7,360,211 B2 | 4/2008 | Hyden et al. | |
| 7,376,682 B2 | 5/2008 | Ramacher et al. | |
| 7,379,455 B2 | 5/2008 | Pickett | |
| 7,412,497 B2 | 8/2008 | Viswanath et al. | |
| 7,426,694 B2 | 9/2008 | Gross et al. | |
| 7,487,231 B2 | 2/2009 | Brown et al. | |
| 7,519,964 B1 * | 4/2009 | Islam et al. | 717/177 |
| 7,526,457 B2 | 4/2009 | Duevel et al. | |
| 7,540,014 B2 | 5/2009 | Vasishth et al. | |
| 7,590,669 B2 * | 9/2009 | Yip et al. | 1/1 |
| 7,593,124 B1 | 9/2009 | Sheng et al. | |
| 7,599,895 B2 | 10/2009 | Nugent | |
| 7,606,840 B2 | 10/2009 | Malik | |
| 7,609,651 B1 * | 10/2009 | McBride et al. | 370/252 |
| 7,610,582 B2 | 10/2009 | Becker et al. | |
| 7,617,256 B2 | 11/2009 | Mohamed et al. | |
| 7,640,542 B1 | 12/2009 | Herenyi et al. | |
| 7,644,432 B2 | 1/2010 | Patrick et al. | |
| 7,657,887 B2 * | 2/2010 | Kothandaraman et al. | 717/176 |
| 7,665,082 B2 | 2/2010 | Wyatt et al. | |
| 7,685,577 B2 * | 3/2010 | Pace et al. | 717/136 |
| 7,716,634 B2 | 5/2010 | Ross et al. | |
| 7,725,877 B2 | 5/2010 | Andrade et al. | |
| 7,739,657 B2 | 6/2010 | Rolfs | |
| 7,823,124 B2 | 10/2010 | Sattler et al. | |
| 2001/0044834 A1 * | 11/2001 | Bradshaw et al. | 709/217 |
| 2001/0054091 A1 | 12/2001 | Lenz et al. | |
| 2002/0026572 A1 * | 2/2002 | Joory | 713/100 |
| 2002/0095663 A1 * | 7/2002 | Joory | 717/136 |
| 2002/0099578 A1 | 7/2002 | Eicher et al. | |
| 2002/0104097 A1 * | 8/2002 | Jerding et al. | 725/115 |
| 2002/0116373 A1 | 8/2002 | Nishikawa et al. | |
| 2002/0138570 A1 | 9/2002 | Hickey | |
| 2002/0147784 A1 * | 10/2002 | Gold et al. | 709/208 |
| 2002/0156947 A1 * | 10/2002 | Nishio | 710/36 |
| 2002/0188625 A1 | 12/2002 | Jans et al. | |
| 2003/0005411 A1 | 1/2003 | Gerken | |
| 2003/0023963 A1 | 1/2003 | Birkholz et al. | |
| 2003/0115292 A1 | 6/2003 | Griffin et al. | |
| 2003/0120780 A1 * | 6/2003 | Zhu et al. | 709/226 |
| 2003/0135842 A1 | 7/2003 | Frey et al. | |
| 2003/0227392 A1 | 12/2003 | Ebert et al. | |
| 2003/0237093 A1 | 12/2003 | Marsh et al. | |
| 2004/0019669 A1 | 1/2004 | Viswanath et al. | |
| 2004/0019670 A1 | 1/2004 | Viswanath et al. | |
| 2004/0031030 A1 | 2/2004 | Kidder et al. | |
| 2004/0060047 A1 | 3/2004 | Talati et al. | |
| 2004/0088691 A1 | 5/2004 | Hammes et al. | |
| 2004/0111417 A1 | 6/2004 | Goto et al. | |
| 2004/0176996 A1 | 9/2004 | Powers et al. | |
| 2004/0186927 A1 | 9/2004 | Eryurek et al. | |
| 2004/0268342 A1 | 12/2004 | Hyden et al. | |
| 2005/0007964 A1 | 1/2005 | Falco et al. | |
| 2005/0044215 A1 * | 2/2005 | Cohen et al. | 709/224 |
| 2005/0044546 A1 | 2/2005 | Niebling et al. | |
| 2005/0080801 A1 * | 4/2005 | Kothandaraman et al. | 707/100 |
| 2005/0086195 A1 | 4/2005 | Tan et al. | |
| 2005/0108219 A1 | 5/2005 | De La Huerga | |
| 2005/0108707 A1 | 5/2005 | Taylor et al. | |
| 2005/0138558 A1 * | 6/2005 | Duevel et al. | 715/700 |
| 2005/0144474 A1 * | 6/2005 | Takala et al. | 713/200 |
| 2005/0160419 A1 | 7/2005 | Alam et al. | |
| 2005/0188422 A1 * | 8/2005 | Jooste | 726/4 |
| 2005/0193103 A1 | 9/2005 | Drabik | |
| 2005/0262076 A1 | 11/2005 | Voskuil | |
| 2005/0262499 A1 | 11/2005 | Read | |
| 2005/0268282 A1 | 12/2005 | Laird | |
| 2005/0278202 A1 | 12/2005 | Broomhall et al. | |
| 2005/0278280 A1 | 12/2005 | Semerdzhiev et al. | |
| 2006/0047793 A1 | 3/2006 | Agrawal et al. | |
| 2006/0173857 A1 * | 8/2006 | Jackson | 707/10 |
| 2006/0184917 A1 | 8/2006 | Troan et al. | |
| 2006/0184926 A1 * | 8/2006 | Or et al. | 717/168 |
| 2006/0224637 A1 | 10/2006 | Wald | |
| 2006/0234698 A1 | 10/2006 | Fok et al. | |
| 2006/0242697 A1 * | 10/2006 | Takemura | 726/19 |
| 2006/0248450 A1 | 11/2006 | Wittenberg et al. | |
| 2006/0253588 A1 * | 11/2006 | Gao et al. | 709/226 |
| 2007/0006161 A1 | 1/2007 | Kuester et al. | |
| 2007/0016591 A1 * | 1/2007 | Beadles et al. | 707/10 |
| 2007/0025704 A1 | 2/2007 | Tsukazaki et al. | |
| 2007/0074203 A1 | 3/2007 | Curtis et al. | |
| 2007/0093926 A1 | 4/2007 | Braun et al. | |
| 2007/0097975 A1 | 5/2007 | Rakers et al. | |
| 2007/0157185 A1 | 7/2007 | Semerdzhiev | |
| 2007/0157192 A1 | 7/2007 | Hoefler et al. | |
| 2007/0168065 A1 | 7/2007 | Nixon et al. | |
| 2007/0198437 A1 | 8/2007 | Eisner et al. | |
| 2007/0234274 A1 | 10/2007 | Ross et al. | |
| 2007/0257715 A1 | 11/2007 | Semerdzhiev et al. | |
| 2008/0059474 A1 * | 3/2008 | Lim | 707/9 |
| 2008/0059490 A1 | 3/2008 | Sattler et al. | |
| 2008/0059537 A1 | 3/2008 | Sattler et al. | |
| 2008/0059630 A1 | 3/2008 | Sattler et al. | |
| 2008/0071555 A1 | 3/2008 | Sattler et al. | |
| 2008/0071718 A1 | 3/2008 | Sattler et al. | |
| 2008/0071828 A1 | 3/2008 | Sattler et al. | |
| 2008/0071839 A1 | 3/2008 | Sattler et al. | |
| 2008/0082517 A1 | 4/2008 | Sattler et al. | |
| 2008/0126375 A1 | 5/2008 | Sattler et al. | |
| 2008/0126448 A1 | 5/2008 | Sattler et al. | |
| 2008/0127082 A1 | 5/2008 | Birimisa et al. | |
| 2008/0127085 A1 | 5/2008 | Sattler et al. | |
| 2008/0127086 A1 | 5/2008 | Sattler et al. | |
| 2008/0127123 A1 | 5/2008 | Sattler et al. | |
| 2008/0195579 A1 | 8/2008 | Kennis et al. | |
| 2009/0024990 A1 | 1/2009 | Singh et al. | |
| 2009/0157455 A1 | 6/2009 | Kuo et al. | |
| 2010/0082518 A1 | 4/2010 | Gaffga et al. | |
| 2010/0153443 A1 | 6/2010 | Gaffga et al. | |
| 2010/0153468 A1 | 6/2010 | Lange et al. | |

FOREIGN PATENT DOCUMENTS

| | | |
|---|---|---|
| WO | WO-2004114130 A2 | 12/2004 |
| WO | WO-2005045670 A1 | 5/2005 |

OTHER PUBLICATIONS

Title: Modeling Deployment and Configuration, author: Sloane et al, source: IEEE dated: Jun. 4, 2006.*

Title: Modeling and Verifying Configuration in Service Deployment, author: Ying Li et al, source: IEEE, dated: Sep. 18, 2006.*

"International Application Serial No. PCT/EP2007/007460, International Search Report Nov. 2, 2007", 5 pgs.

"International Application Serial No. PCT/EP2007/007460, Written Opinion Nov. 2, 2007", 7 pgs.

"International Application Serial No. PCT/EP2007/007461. International Search Report Nov. 26, 2007", 7 pgs.

"International Application Serial No. PCT/EP2007/007462, Partial International Search Report Dec. 27, 2007", 8 pgs.

"International Application Serial No. PCT/EP2007/007490, International Search Report Oct. 26, 2007", 4 pgs.

"International Application Serial No. PCT/EP2007/007491, International Search Report Oct. 22, 2007", 5 pgs.

"International Application Serial No. PCT/EP2007/007491, Written Opinion Oct. 22, 2007", 6 pgs.

"International Application Serial No. PCT/EP2007/007515, International Search Report Nov. 12, 2007", 8 pgs.

Indigorose, "Setup Factory", *User's Guide IndigoRose Software Design No. 2*, (Mar. 1998), 82 pgs.

"U.S. Appl. No. 11/512,517, Response to Non-Final Office Action mailed Jan. 29, 2009", 16 pgs.

"U.S. Appl. No. 11/512,609, Final Office Action mailed Dec. 8, 2008", 12 pgs.

"U.S. Appl. No. 11/512,884, Final Office Action mailed Dec. 19, 2008", 11 pgs.

"U.S. Appl. No. 11/512,886, Non-Final Office Action mailed Dec. 26, 2008", 10 pgs.

"International Application Serial No. PCT/EP2007/007461, International Search Report mailed Feb. 5, 2008", 8 pgs.

"International Application Serial No. PCT/EP2007/007461, Written Opinion mailed Feb. 5, 2008", 9 pgs.

"International Application Serial No. PCT/EP2007/007462, International Search Report Mailed Mar. 17, 2008", 7 pgs.

"International Application Serial No. PCT/EP2007/007462, Written Opinion Mailed Mar. 17, 2008", 8 pgs.

"International Application Serial No. PCT/EP2007/007490, International Search Report mailed Jan. 24, 2008", 7 pgs.

"International Application Serial No. PCT/EP2007/007490, Written Opinion mailed Jan. 24, 2008", 9 pgs.

"International Application Serial No. PCT/EP2007/007515, International Search Report mailed Jan. 24, 2008", 8 pgs.

"International Application Serial No. PCT/EP2007/007515, Written Opinion mailed Jan. 24, 2008", 12 pgs.

"U.S. Appl. No. 11/512,442, Final Office Action mailed Apr. 21, 2010", 13 pgs.

"U.S. Appl. No. 11/512,442, Response filed Jan. 4, 2010 to Non Final Office Action mailed Oct. 1, 2009", 10 pgs.

"U.S. Appl. No. 11/512,443, Final Office Action mailed Jan. 22, 2010", 14 pgs.

"U.S. Appl. No. 11/512,443, Response filed Apr. 22, 2010 to Final Office Action mailed Jan. 22, 2010", 12 pgs.

"U.S. Appl. No. 11/512,457, Non-Final Office Action mailed May 13, 2010", 11 pgs.

"U.S. Appl. No. 11/512,516, Final Office Action mailed Mar. 5, 2010", 16 pgs.

"U.S. Appl. No. 11/512,516, Response filed Apr. 30, 2010 to Final Office Action mailed Mar. 5, 2010", 9 pgs.

"U.S. Appl. No. 11/512,517, Examiner Interview Summary mailed Dec. 24, 2009", 3 pgs.

"U.S. Appl. No. 11/512,517, Notice of Allowance mailed Jan. 21, 2010", 8 pgs.

"U.S. Appl. No. 11/512,517, Response filed Dec. 14, 2009 to Non Final Office Action mailed Sep. 16, 2009", 8 pgs.

"U.S. Appl. No. 11/512,520, Notice of Allowance mailed Jan. 25, 2010", 6 pgs.

"U.S. Appl. No. 11/512,608, Non-Final Office Action mailed May 12, 2010", 12 pgs.

"U.S. Appl. No. 11/512,609, Final Office Action mailed Nov. 20, 2009", 15 pgs.

"U.S. Appl. No. 11/512,886, Notice of Allowance mailed Dec. 24, 2009", 8 pgs.

"European Application Serial No. 09012347.2, Extended European Search Report mailed Nov. 26, 2009", 5 pgs.

Krintz, Chandra J., ""Reducing load delay to improve performance of Internet-computing programs"", *University of California*, San Diego, (2001), 225 pgs.

"U.S. Appl. No. 11/512,442, Non Final Office Action mailed Oct. 1, 2009", 15 pgs.

"U.S. Appl. No. 11/512,443, Examiner Interview Summary mailed Oct. 7, 2009", 4 pgs.

"U.S. Appl. No. 11/512,443, Final Office Action mailed Feb. 6, 2009", 20 pgs.

"U.S. Appl. No. 11/512,443, Non-Final Office Action mailed Jun. 26, 2009", 11 pgs.

"U.S. Appl. No. 11/512,443, Response filed Apr. 3, 2009 to Final Office Action mailed Feb. 6, 2009", 13 pgs.

"U.S. Appl. No. 11/512,443, Response filed Sep. 28, 2009 to Non Final Office Action mailed Jun. 26, 2009", 16 pgs.

"U.S. Appl. No. 11/512,516, Non-Final Office Action mailed Feb. 4, 2009", 12 pgs.

"U.S. Appl. No. 11/512,516, Non-Final Office Action mailed Jul. 10, 2009", 15 pgs.

"U.S. Appl. No. 11/512,516, Response filed Apr. 28, 2009 to Non Final Office Action mailed Feb. 4, 2009", 16 pgs.

"U.S. Appl. No. 11/512,516, Response filed Oct. 9, 2009 to Non Final Office Action mailed Jul. 10, 2009", 9 pgs.

"U.S. Appl. No. 11/512,517, Non-Final Office Action mailed Sep. 16, 2009", 16 pgs.

"U.S. Appl. No. 11/512,517, Notice of Allowance mailed Apr. 3, 2009", 10 pgs.

"U.S. Appl. No. 11/512,519, Final Office Action mailed Feb. 2, 2009", 14 pgs.

"U.S. Appl. No. 11/512,520, Non-Final Office Action mailed Jul. 22, 2009", 14 pgs.

"U.S. Appl. No. 11/512,520, Response filed Oct. 22, 2009 to Non Final Office Action mailed Jul. 22, 2009", 13 pgs.

"U.S. Appl. No. 11/512,609, Non Final Office Action mailed Apr. 27, 2009", 15 pgs.

"U.S. Appl. No. 11/512,609, Response filed Feb. 17, 2009 to Final Office Action mailed Dec. 8, 2008", 10 pgs.

"U.S. Appl. No. 11/512,609, Response filed Jul. 24, 2009 to Non Final Office Action mailed Apr. 27, 2009", 11 pgs.

"U.S. Appl. No. 11/512,886, Examiner Interview Summary mailed Sep. 29, 2009", 2 pgs.

"U.S. Appl. No. 11/512,886, Final Office Action mailed Jun. 24, 2009", 11 pgs.

"U.S. Appl. No. 11/512,886, Response filed Mar. 25, 2009 to Non Final Office Action mailed Dec. 26, 2008", 9 pgs.

"U.S. Appl. No. 11/512,886, Response filed Jan. 22, 2009 to Final Office Action mailed Jun. 24, 2009", 10 pgs.

"U.S. Appl. No. 11/512,443, Response filed Oct. 9, 2008 to Non-Final Office Action mailed Jul. 9, 2008", 11 pgs.

"U.S. Appl. No. 11/512,443, Non-Final Office Action mailed Jul. 9, 2008", 17 pgs.

"U.S. Appl. No. 11/512,517, Non-Final Office Action mailed Oct. 29, 2008", 13 pgs.

"U.S. Appl. No. 11/512,519 response filed Nov. 11, 2008 to Non-Final Office Action mailed Sep. 11, 2008", 15 pgs.

"U.S. Appl. No. 11/512,519, Non-Final Office Action mailed Sep. 11, 2008", 14 pgs.

"U.S. Appl. No. 11/512,609, Non Final Office Action mailed on Jun. 19, 2008", 9 pgs.

"U.S. Appl. No. 11/512,609, Response filed Sep. 19, 2008 to Non-Final Office Action mailed Jun. 19, 2008", 8 pgs.

"U.S. Appl. No. 11/512,884, Non-Final Office Action Mailed Jun. 29, 2008", 12 pgs.

"U.S. Appl. No. 11/512,884, Response filed Sep. 23, 2008 to Non-Final Office Action mailed Jul. 29, 2008", 17 pgs.

Liu, et al., "A Knowledge-Based Approach to Requirements Analysis", (1995).

"U.S. Appl. No. 11/511,357, Non-Final Office Action mailed Jul. 2, 2010", 11 pgs.

"U.S. Appl. No. 11/512,441, Non-Final Office Action mailed Jun. 21, 2010", 8 pgs.

"U.S. Appl. No. 11/512,441, Response filed Sep. 21, 2010 to Non Final Office Action mailed Jun. 21, 2010", 8 pgs.

"U.S. Appl. No. 11/512,442, Response filed Jun. 21, 2010 to Final Office Action mailed Apr. 21, 2010", 9 pgs.

"U.S. Appl. No. 11/512,457 Notice of Allowance mailed Aug. 13, 2010", 13 pgs.

"U.S. Appl. No. 11/512,457, Notice of Allowance mailed Sep. 17, 2010", 7 pgs.

"U.S. Appl. No. 11/512,457, Response filed Aug. 5, 2010 to Non Final Office Action May 13, 2010", 10 pgs.

"U.S. Appl. No. 11/512,516 Non-Final Office Action mailed Jul. 8, 2010", 20 pgs.

"U.S. Appl. No. 11/512,516, Response filed Oct. 8, 2010 to Non Final Office Action mailed Jul. 8, 2010", 11 pgs.

"U.S. Appl. No. 11/512,517, Non-Final Office Action mailed Aug. 16, 2010", 30 pgs.

"U.S. Appl. No. 11/512,518 Final Office Action mailed Oct. 15, 2010", 20.

"U.S. Appl. No. 11/512,518, Non-Final Office Action mailed May 27, 2010", 14 pgs.

"U.S. Appl. No. 11/512,518, Response filed Aug. 24, 2010 to Non Final Office Action mailed May 27, 2010", 10 pgs.

"U.S. Appl. No. 11/512,520 Notice of Allowance mailed Sep. 29, 2010", 6 pgs.

"U.S. Appl. No. 11/512,520, Notice of Allowance mailed Jun. 15, 2010", 6 pgs.

"U.S. Appl. No. 11/512,608 Notice of Allowance mailed Sep. 8, 2010", 8 pgs.

"U.S. Appl. No. 11/512,608, Notice of Allowance mailed Aug. 13, 2010", 9 pgs.

"U.S. Appl. No. 11/512,608, Response filed Aug. 5, 2010 to Non Final Office Action mailed May 12, 2010", 10 pgs.

"U.S. Appl. No. 11/512,443 Notice of Allowance mailed Sep. 21, 2010", 17 pgs.

"U.S. Appl. No. 11/512,457 Notice of Allowance mailed Sep. 17, 2010", 8 pgs.

Bellissard, Luc, et al., "Component-based Programming and Application Management with Olan, Proceedings of Workshop on Distributed Computing", Retrieved on [Jun. 15, 2010] Retrieved from the Internet: URL<http://www.springerlink.com/contenUf2g8rI4083393124/fulitext.pdf>, (1995).

Brown, W J, et al., ""Configuration Management Plan for the Science Data Processing System"", Upper Marlboro, Maryland, (Apr. 2001).

Dotoli, et al., "A decision support system for the supply chain configuration", IEEE, (Oct. 8, 2003), 6 pgs.

Gu, Mingyang, et al., "Component Retrieval Using Conversational Case-Base Reasoning", IEA/AIE, Annecy, France, (Jun. 27-30, 2006), 12 pgs.

Hwang, Jeong Hee, et al., "Context Based Recommendation Service in Ubiquitous Commerce", Database Laboratory, Chungbuk National University, Korea, Springer—Verlag Berlin Heidelberg,, (2005).

Kahl, Fredrik, et al., "Critical configurations for n-view projective reconstruction", IEEE, (Dec. 14, 2001), 6 pgs.

Park, Young, "Software retrieval by samples using concept analysis", Journal of Systems and Software 54, (2000), 179-183.

Virgilo, "A Rule-based Approach to Content Delivery Adaptation in Web Information Systems", Proc. 7th International Conference on Mobile Data Management, IEEE, (May 13, 2006), 4 pgs.

US 7,571,147, 08/2009, Sattler et al. (withdrawn)

US 7,730,006, 06/2010, Wiesloch et al. (withdrawn)

* cited by examiner

FIG. 5

DEPLOYMENT

TECHNICAL FIELD

The inventive subject mater relates to software application configuration and, more particularly, deployment of a software application configuration.

BACKGROUND INFORMATION

Configuring software applications can be a difficult task. The difficulty in configuration such systems grows in complexity as the size of the software application increases. An example of a complex software application to configure is an enterprise resource planning ("ERP") application. Efforts to configure such applications often involves a large number of employees and even consultants. These efforts string out over at least many months, and even multiple years. Further, modifying a large software application configuration or upgrading such an application can, depending on the size of the configuration modification project or scope of the application upgrade, involve equal amounts of time and cost as an initial implementation.

A major cause for the complexity of modifying and upgrading such software applications is that configuration settings are often stored in configuration tables. The configurations settings in these tables do not provide any context of what the configuration setting is for, other than by reference to a manual or from the experience of person modifying the setting. Thus, modifying application configurations often falls upon highly skilled and experienced individuals, such as consultant. However, such individuals or consultants may not have the intrinsic knowledge of an organization that utilizes the application. This causes the configuration efforts to take additional time and cost more.

These configuration settings are often spread across multiple tables, or other data structures. When configuring an application in a non-production environment, moving the configuration settings to another environment can be a large task by itself. Thus, configuring such applications is not only complex and time consuming, replicating the configuration settings from one environment, or application instance, to another is a large task unto itself.

DETAILED DESCRIPTION

Some embodiments described herein provide an application configuration environment and an application execution environment. The application configuration environment may provide an environment within which an application can be configured. However, the application cannot execute within the application execution environment. Execution typically occurs in the application execution environment. Thus, the various embodiments provide a deployment mechanism in the form of systems, methods, and software to deploy a configuration from the application configuration environment to the application execution environment.

In some embodiments, the deployment mechanism may also replicate a configuration of an application instance from the application execution environment to another application instance in the application execution environment. Such embodiments allow not only configuration in the application configuration environment separate from a production instance, but also may allow testing of a development or testing application instance separate from the production instance. These embodiments, and others, are discussed in detail with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, electrical, or other changes may be made without departing from the scope of the inventive subject matter. Such embodiments of the inventive subject matter may be referred to, individually and/or collectively, in the present application by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described in the present application are implemented in hardware, software or a combination of software and hardware in one or more embodiments. The software comprises computer executable instructions stored on computer readable media such as memory or other type of storage devices. The term "computer readable media" is also used to represent carrier waves on which the software is transmitted. Further, such functions correspond to modules, which may be one or more, or a combination of, software, hardware, or firmware. Multiple functions are performed in one or more modules as desired, and the embodiments described are merely examples. The software may be executed on a digital signal processor, ASIC, microprocessor, or other type of processor operating on a system, such as a personal computer, server, a router, or other device capable of processing data including devices interconnected by a network.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
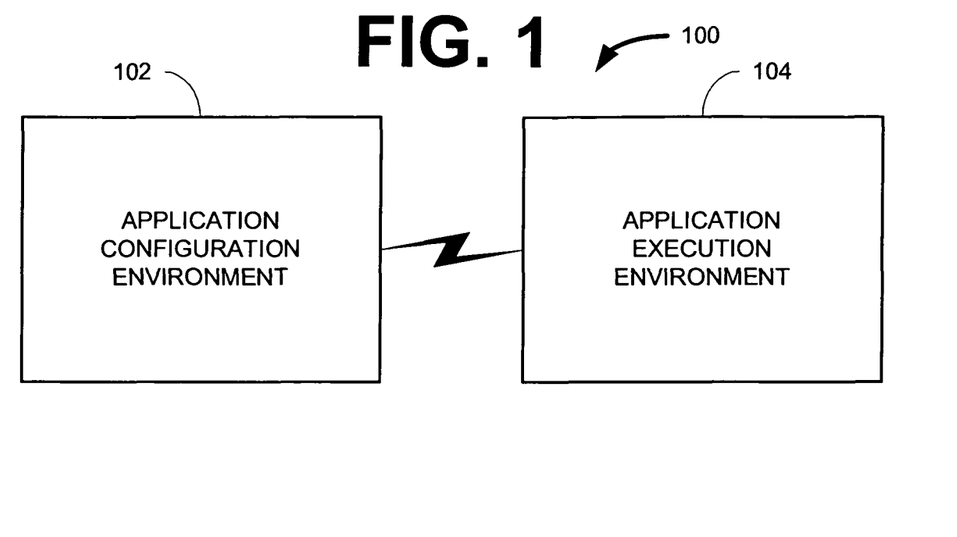
FIG. 1 is a block diagram of a system according to an example embodiment.

FIG. 1 is a block diagram of a system 100 according to an example embodiment. The system 100 includes an application configuration environment 102 and an application execution environment 104.

The application configuration environment 102 is a system 100 environment within which an application can be configured. However, the application will, or does, execute within the application execution environment 104. In some embodiments, this arrangement of the application configuration environment 102 and the application execution environment 104 separates the configuration of an application from the environment within which it executes. When an application configuration has been established, all or part of the configuration can then be deployed to the application execution environment 104. This deployment can occur to one or more separate instance of the application in the application execution environment 104. Although only a single application execution environment 104 is illustrated, multiple application execution environments 104 can exist, and the deployment can be made to one or more of the multiple application execution environments 104.

Figure 2A:
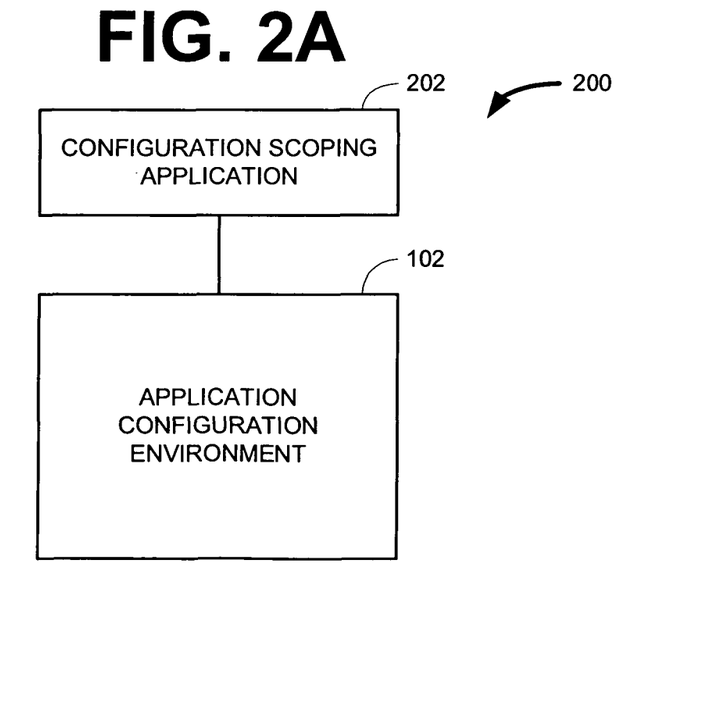
FIG. 2A is a block diagram of a system according to an example embodiment.

FIG. 2A is a block diagram of a system 200 according to an example embodiment. The system 200 includes a configuration scoping application 202 and the application configuration environment 102.

The configuration scoping application 202 typically is a software tool that executes on a computing device, such as a portable computer, on a same computing device within which the application configuration environment 102 exists, or on another computing device that can be communicatively coupled to the application configuration environment 102.

The configuration scoping application 202, when executed, typically presents a set of scoping questions to a user. The scoping questions are linked to one of many adaptation catalog entries. The adaptation catalog entries include a representation of all of the solution capabilities of an application to be configured, and eventually executed. In some embodiments, the solution capabilities are hierarchically divided into areas, packages, topics, and options. There may be multiple areas and each area may have multiple packages. Each package may have multiple topics and each topic may have multiple options.

In some embodiments, such as in an example embodiment where the application to be configured is an ERP application, the adaptation catalog may provide in the area Sales, a package Customer Order Management that contains the topics Sales Order Quote, Sales Order, Sales Order Analysis, and others. On that level, one or more options typically exist such as Approval Processing.

In the configuration scoping application 202, as stated above, each scoping question may be linked to an adaptation catalog entry. An adaptation catalog entry further includes a rule. These rules typically model dependencies between the areas, packages, topics, and options and corresponding solution capabilities of the application. A rule may specify required inclusion or exclusion of other areas, packages, topics, or options, or may require specification of further areas, packages, topics, or options. A rule may also specify a recommendation or default area, package, topic, or option.

For example, a first example scoping question, "What is the primary focus of your business?" may have three possible answers including "Sales," "Service," and "Logistics." Such a first scoping question typically is aimed at identifying an area of business in which the application is going to be used. Answering "Sales" typically tells the configuration scoping application 202 that the area is "Sales" and a rule tied to the adaptation catalog entry for "Sales" specifies dependencies with packages, topics, and options and the corresponding solution capabilities of the application necessary or optional in using the application in a sales business. Such a rule can also specify that other packages, topics, and options and the corresponding solution capabilities are excluded.

Figure 2B:
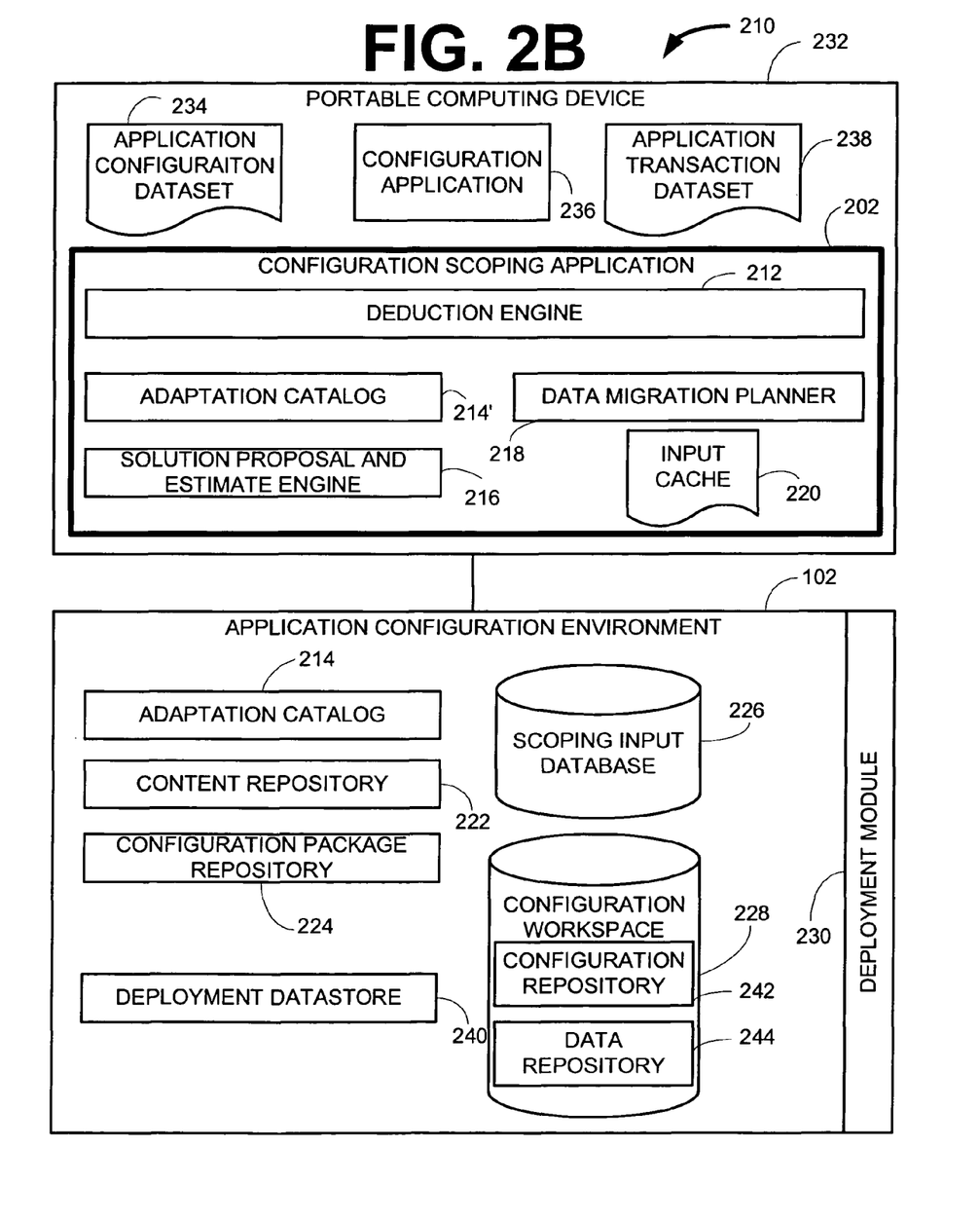
FIG. 2B is a block diagram of a system according to an example embodiment.

Thus, when a user answers scoping questions, the configuration of the application is being performed. Further, when a question is answered that is associated with an adaptation catalog entry having a rule that excludes another area, package, topic, or option, that rule may be applied to eliminate questions from consideration. Conversely, when a question is answered that is associated with an adaptation catalog entry having a rule that requires another area, package, topic, or option, that same rule may be applied to determine a next question, or group of questions, to ask a user. However, in the event that a question is not answered that is linked to a rule providing defaults, the question may be skipped without adversely affecting the application configuration. FIG. 2B provides further detail of some embodiments of the configuration scoping application 202 in conjunction with an embodiment of the application configuration environment 102.

FIG. 2B is a block diagram of a system 210 according to an example embodiment. The system 210 includes a portable computing device 232 including a configuration application 236, an application configuration dataset 234 stored in a memory, an application transaction dataset 238 and the configuration scoping application 202. The system 210 further includes the application configuration environment 102. Although the application configuration environment 102 is not illustrated within the portable computing device 232, in some embodiments, the application configuration environment 102 may reside within the portable computing device 232. In other embodiments, the application configuration environment 102, the configuration scoping application 202, the application configuration dataset 234, the configuration application 236, and the application transaction dataset 238 may all reside on a computing device other than the portable computing device 232.

The configuration application 236, in some embodiments, typically provides a set of tools via user interfaces to a user. The tools of the configuration application 236 may allow the user to modify answers to scoping question answers stored in an input cache 220 of the configuration scoping application 202, the application configuration dataset 234, and the application transaction dataset 238. The application configuration dataset 234 may be populated with data copied from a configuration repository 242 stored within a configuration workspace 228 of the application configuration environment 102. The application transaction dataset 238 may be populated with data copied either from a demonstration dataset stored in data repository 244 of the configuration workspace 228 or from the content repository 222.

Although the input cache 220 is illustrated within the configuration scoping application 202, the input cache 220 may exist separate from the configuration scoping application 202 within a memory of the portable computing device 232. In such embodiments, the input cache 220 may be populated with data copied from the scoping input database 226.

For the sake of understandability regarding several portions of the configuration scoping application 202 and the application configuration environment 102, these portions of the system 210 will be discussed followed by a more detailed discussion of the configuration application 236.

The configuration scoping application 202, in some embodiments, includes a deduction engine 212 and an adaptation catalog 214'. In this embodiment, the configuration scoping application 202 further typically includes a solution proposal and estimate engine 216, a data migration planner 218, and the input cache 220.

The application configuration environment 102, in some embodiments, includes an adaptation catalog 214, a content repository 222, and a configuration package repository 224. In some such embodiments, the application configuration environment 102 further includes a scoping input database 226, a configuration workspace 118, a deployment module 230, and a deployment datastore 240.

The adaptation catalog 214 may include a representation of all of the solution capabilities of an application to be configured, and eventually executed. Each capability of an application to be configured is identified in an adaptation catalog 214 entry. The adaptation catalog 214 entries each may be identified as an area, package, topic, or option and may be organized in a hierarchy with a child identifying the parent. An example hierarchy is a "General Ledger" capability, which in some embodiments typically is a package having two topics, "cash based" and "accrual based" which are two application capabilities within the "General Ledger" capability.

The adaptation catalog 214 entries may further include scoping questions directed toward obtaining scoping information to determine what areas, packages, topics, and options are relevant to the user's needs. Additionally, the adaptation catalog entries typically include rules, the application of which can require inclusion or exclusion, or specify default inclusion or exclusion, of certain other areas, packages, topics, and options. Thus, because the areas, packages, topics, and options correlate to application capabilities, the inclusion, exclusion, and defaulting specifies what capabilities will be enabled and disabled in the application when deployed by the deployment module 230.

In some embodiments, rules and entries in the adaptation catalog can be linked to a configuration package that exists in the configuration package repository 224. A configuration package includes one or more configuration settings that enable or disable functionality of the application when deployed by the deployment module 230 or by a configuration process within the application configuration environment 102 when configuring the application within the configuration workspace 228. A configuration package can further be linked to one or more content items or content item definitions stored in the content repository 222. Some such content types include report layouts, forms, user interfaces, communication specifications, documentation, and other content that can be used in an application when deployed. A communication specification can include an XML schema, an EDI schema and connectivity information, mappings between file layouts and application data storage mechanisms, such as databases, and other similar communication specifications.

The rules of adaptation catalog 214 entries may also be used by the deduction engine 212 of the configuration scoping application 202. The configuration scoping application 202 typically presents a user interface to a user that requests answers to questions. The questions to be asked via the user interface may be identified by the deduction engine 212 based on the adaptation catalog 214'. The adaptation catalog 214' is typically a copy of the adaptation catalog 214 from the application configuration environment 102. When an answer is received by the configuration scoping application 202 through the user interface, the answer may be stored in the input cache 220 of the configuration scoping application 202. The deduction engine 212 may then apply the rule associated with the adaptation catalog 214' entry of the question asked to the received answer. Through the application of the rule, in view of answers already received and rules already applied, the deduction engine 212 typically identifies a next question to ask. The identified question may then be presented to the user through the user interface. This process typically continues until either all of the questions have been asked, the user is out of time, or otherwise chooses to stop. If questions remain that have not been answered, the process may be continued at a later time or rules specifying default areas, packages, topics, and options typically supply enough information to allow deployment of the application in a functional form.

In some embodiments, the configuration scoping application 218 may further include a data migration planner 218. In such embodiments, one or more additional scoping questions may be asked. These additional scoping questions are typically directed toward obtaining information from the user about legacy systems and how data is stored within them. In some embodiments, the questions simply may ask what systems are currently in use. In other embodiments, the questions may be more detailed to obtain information such as what type of database an application is utilizing and what type of customization has been made or custom applications developed. The data migration planner 218 may then use the answers to these additional questions to propose a data migration plan to the new application.

In some embodiments, the configuration scoping application 202 includes a solution proposal and estimate engine 216. The solution proposal and estimate engine 216 may be used in a sales situation. For example, if a sales person is discussing with a sales lead what a certain application product can do for the sales lead, the sales person typically can utilize the configuration scoping application 202 to obtain information about the needs of the sales lead via the scoping questions. The scoping question answers may then be utilized by the solution proposal and estimate engine 216 to make an initial determination of what will be involved if the sales lead decides to purchase the application. The solution proposal and estimate engine 216 normally is configured to output information for the sales lead to make several determinations, such as the size of effort necessary to implement or transition to the application from legacy system, the cost involved, and cost. In some embodiments, the output of the solution proposal and estimate engine 216 outputs one or more of an implementation cost estimate, an application solution proposal, and a recommended project roadmap. In some embodiments, the solution proposal and estimate engine 216 outputs a proposal for one or more other options, application descriptions, sales literature, benefit statements of using the application, and addition documents, such as a proposal of key performance indicators the application can monitor to assist in managing the application or enterprise of the sales lead.

After the scoping question have been answered, the answers, and any other information obtained from a sales lead or other user of the configuration scoping application 202, the information typically is uploaded to the application configuration environment 102. However, in embodiments, where the configuration scoping application 202 executes on the same computing device as the application configuration environment 202, the scoping question answers and other information may be stored directly to the application configuration environment 102.

When the configuration question answers and other information is uploaded, or otherwise stored to the application environment 102, the scoping question answers are stored to the scoping input database 226. The scoping question answers, in some instances, will be referred to interchangeably as the "scoping information."

After the scoping information is within the scoping input database 226, a process within the application configuration environment 102 typically executes to begin configuring an application in the configuration repository 242 of the configuration workspace 228. The configuration repository 242 may include a set of configuration tables that mirrors, at least in part, the configuration tables of the application. The configuration repository 242 may include a set of configuration tables for each of multiple instances of the application to allow use of the application configuration environment 102 to configure multiple application instances.

The process that configures the application may be configured to determine one or more configuration packages to instantiate in the configuration repository 242. Configuration packages, in some embodiments, may include one or a set of configuration settings to enable or disable certain capabilities of the application. Configuration packages, as mentioned above, may be linked to adaptation catalog 214 entries and rules associated with adaptation catalog entries. Thus, the process that configures the application in the configuration repository 242 may be configured to query the scoping information in the scoping input database 226 to identify configuration packages to instantiate.

In some embodiments, demonstration data may exist to facilitate instantiation of a demonstration instance of the application for a sales lead, training session, or other purpose. The demonstration data, in some embodiments, is linked to one or more configuration packages from the configuration package repository 224. The demonstration data typically exists in the content repository 222 so that it can be copied into a set of application tables in the data repository 244 of the configuration workspace 228. These tables may hold such data as transactional data, operational data, master data, or other data that can exist in the application when the application is ready for execution or is executed.

Once the demonstration data is copied to the data repository 244, that data may be fine-tuned to more closely match the intended use of the demonstration data. For example, the system may be configured so that a sales person, or other individual, can fine-tune demonstration data values to more closely match a sales lead's expectations of the application. Such fine tuning may include modifying sales order documents in the demonstration data to include a name, address, and logo of the sales lead's enterprise, or other similar modifications to the demonstration data.

Some embodiments of the application configuration environment 102 may further include the deployment datastore 240. The deployment datastore 240 typically stores a representation of one or more application configurations of applications that have been deployed. The representations of the one or more application configuration may be stored or updated in the deployment datastore 240 by the deployment module 230 upon successful deployment of an application.

A representation of an application configuration typically includes data representative of the application configuration settings. In some embodiments, the representation may further include data representative of content deployed to the application.

The deployment datastore 240, in some embodiments, may be updated upon each configuration or content modification of a deployed system. In some embodiments, the deployment datastore may further include a versioning mechanism that maintains not only a current configuration representation, but also historical representations.

In some embodiments, the deployment datastore 240, or a current copy thereof, may be maintained by an entity that developed, or otherwise offers for sale, the application. The deployment datastore 240 may be used by the entity to monitor current application usage, perform billing processes as a function of a current application configuration, provide application upgrade information based on portions of the application or content utilized, and for other purposes. In some embodiments, the entity may provide application updates, bug fixes, or other upgrades directly to a deployed application instance. Such updates, bug fixes, or other upgrades may be identified as relevant to a particular application instance as a function of the configuration representation in view of adaptation catalog 214 entries.

As described above, the configuration application 236, in some embodiments, may provide a set of tools via user interfaces to a user. The tools of the configuration application 236 typically allow the user to modify answers to scoping question answers stored in an input cache 220, the application configuration dataset 234, and the application transaction dataset 238. The application configuration dataset 234 may be populated with data copied from the configuration repository 242. The application transaction dataset 238 may be populated with data copied from either a demonstration dataset stored in the data repository 244 or from the content repository 222. The input cache 220, if separate from the configuration scoping application 202 may be populated with scoping information copied from the scoping input database 226.

Through use of the configuration application 236 user interfaces, a user may modify data within the application transaction dataset 238 to customize the data used of a demonstration application to more closely reflect how a sales lead's enterprise will use the application. For example, through modifying the transaction data, data displayed within the demonstration may include orders with products, customers, addresses, countries, and other details that truly reflect those of the sales lead's enterprise.

Further, use of the configuration application 236 user interfaces may also allow a user to further refine an application configuration to more closely match the needs of a customer or sales lead. This can include a user taking a copy of an application configuration to work on while away from a connection to the application to be configured or application configuration environment 102, such as when traveling.

In some embodiments, the configuration application 236 may further include a warehouse-modeling module. The warehouse-modeling module may include a deduction engine 212 and a subset of an adaptation catalog 214 as discussed above, or may leverage the deduction engine 212 and adaptation catalog 214' of the configuration scoping application 202 if present on the portable computing device 232. In such embodiments, the adaptation catalog 214 (or 214') may further include one or more area, package, topic, option hierarchies of adaptation catalog 214 entries. The user may answer scoping questions to identify and define a warehouse layout and processes utilized within a warehouse to be modeled. Such warehouse modeling data, once defined, may be copied to the data repository. In some embodiments, such information is similar to configuration settings as a warehouse layout is not subject to frequent change. However, warehouse layouts are generally unique to each warehouse. Thus, warehouse data may be stored in the data repository and may be deployed to an application data table instead of a configuration table.

Figure 3A:
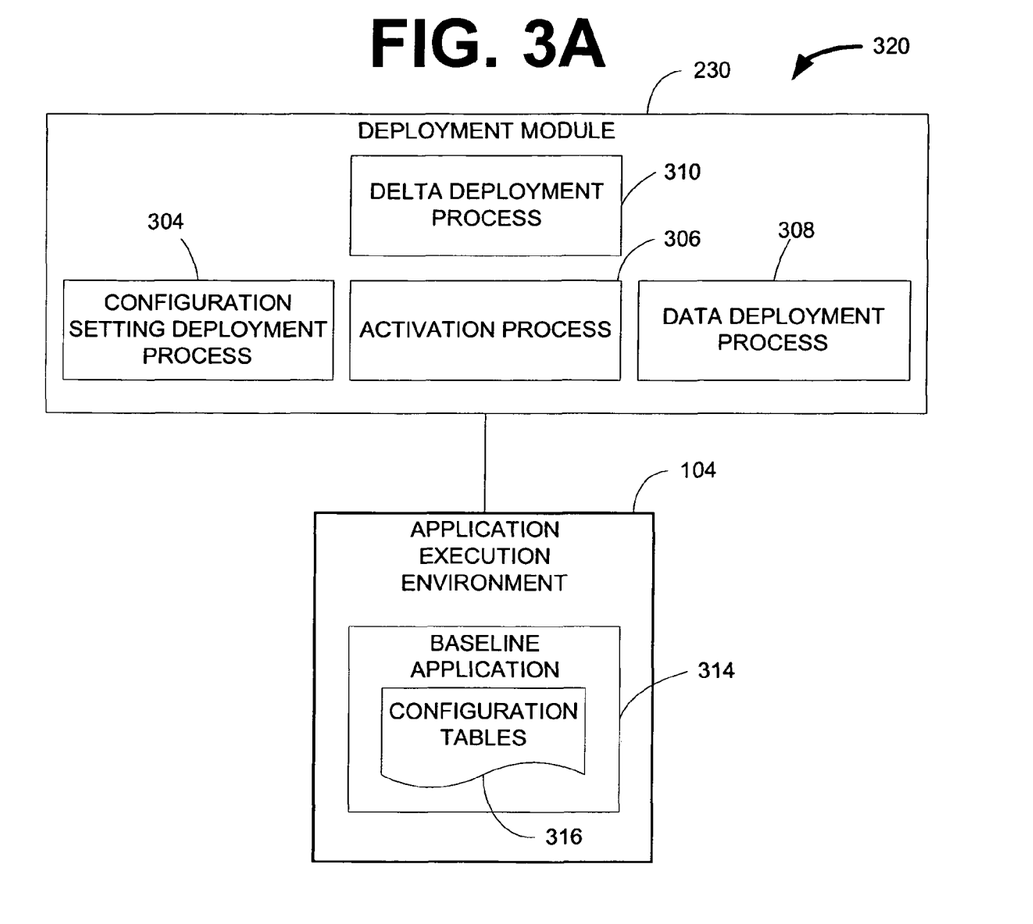
FIG. 3A is a block diagram of a system according to an example embodiment.

After the application has been configured in the configuration workspace 228 and the demonstration data, if any, is ready, the configuration can be deployed by the deployment module 230. Detail of the deployment module 230 is provided in FIG. 3A. FIG. 3A is a block diagram of a system 320 according to an example embodiment. The system 320 typically includes the deployment module 320 and the application execution environment 104.

The deployment module 230 may include a configuration setting deployment process 304, an activation process 306, and a data deployment process 308. Some embodiments of the deployment module may further include a delta deployment process 310.

The application execution environment 104 may includes a baseline application 314. The baseline application 314 is an application that has been instantiated, but has not been configured. The baseline application may include a set of configuration tables 316 that will be populated by the deployment module 230. The baseline application 314 may further include other tables, data structures, and storage locations that may be populated by the deployment module 230 with one or more of demonstration data, application data, content, or other data.

The deployment module 230, when executed, typically operates to deploy an application configured in the application configuration environment. Deployment is typically performed by one or more of the processes of the deployment module 310. These processes may include the configuration setting deployment process 304, the data deployment process 208, the activation process 306, and the delta deployment process 310. Some embodiments of the deployment module 230 may include one or more of these processes.

The configuration setting deployment process 304 typically deploys configuration settings to the configuration tables 326 of the baseline application 314 if the baseline application 314 has already been instantiated. However, in some embodiments, if the baseline system 314 has not been instantiated, the configuration setting deployment process 304, or other process of the deployment module may instantiate the baseline system 314 or call another process that will instantiate the baseline system 314. The deployment of the configuration settings may include a copying of configuration settings from the configuration tables of the configuration repository 242, as shown and described with reference to FIG. 2B, to the configuration tables 316 of the baseline application. In some embodiments, a configuration setting that is copied to the baseline application 314 may refer to an item of content or data stored in the data repository 244, of FIG. 2B, or the content repository 222, of FIG. 2B. In some such instances, the configuration setting deployment process 304 may call a method of the data deployment process 308 to cause that data or content to be copied to the baseline application 314. In other embodiments, that data or content may be copied when the data deployment process 308 is executed at either an earlier or a later time.

The data deployment process 308 may be executed if there is demonstration data in the configuration workspace 228 or if there is content to deploy from the data repository 244 of FIG. 2B or the content repository 222 of FIG. 2B. If there is demonstration data, the data may be copied from the configuration workspace 228 to application tables, data structures, storage locations, or other data stores in the application execution environment 104. If a proper table, data structure, storage location, or other data store does not exist in the application execution environment, the data deployment process, in some embodiments, is configured to execute, or call a method of another module, to cause that data location to be created or allocated.

Some embodiments of the deployment module 230 may further include the activation process 306. The activation process, in some embodiments, is configured to execute to activate the baseline application 314 after it has been successfully deployed. In some instances, the activation process 314 may require an activation key, message, code, or other authorization from an activation authority to activate the configured baseline application 314. The activation authority may include one or more of a number of individuals or entities. An example of an activation authority may include an entity selling the baseline application 314 to be activated.

This activation process 306 and associated functionality may be utilized for several purposes. Some such purposes may include allowing the entity selling the application to ensure the application is properly configured, has passed certain testing necessary for the entity to ensure it will meet guaranteed service level agreements or objectives, for billing purposes, or other purposes that may benefit from such an activation process.

In some embodiments, the activation key, or other activation signal may be received over a network, such as the Internet. In other embodiments, the activation key, or other activation signal, may be manually input into an administration user interface or configuration table of the configured baseline application 314.

In some embodiments, the deployment module 230 may further include the delta deployment process 310. The delta deployment process is typically only relevant after an application has already been deployed. When an application is deployed, or subsequently modified, a representation of the application configuration may be stored or updated in the deployment datastore 240 as described and illustrated with reference to FIG. 2B. This may enable tracking of a current configuration of a deployed application. In embodiments including the delta deployment process 310, the scoping information may further be tracked on a historical basis to at least allow a view of a current configuration and a modified configuration not yet deployed, if applicable. The delta deployment process 310 may then use that historical tracking of the application configuration to identify changes between the current application configuration and the modified configuration not yet deployed. The delta deployment process 310 may then only deploy the changes to the application configuration and any additional content needed or otherwise referenced by the new application configuration.

Figure 3B:
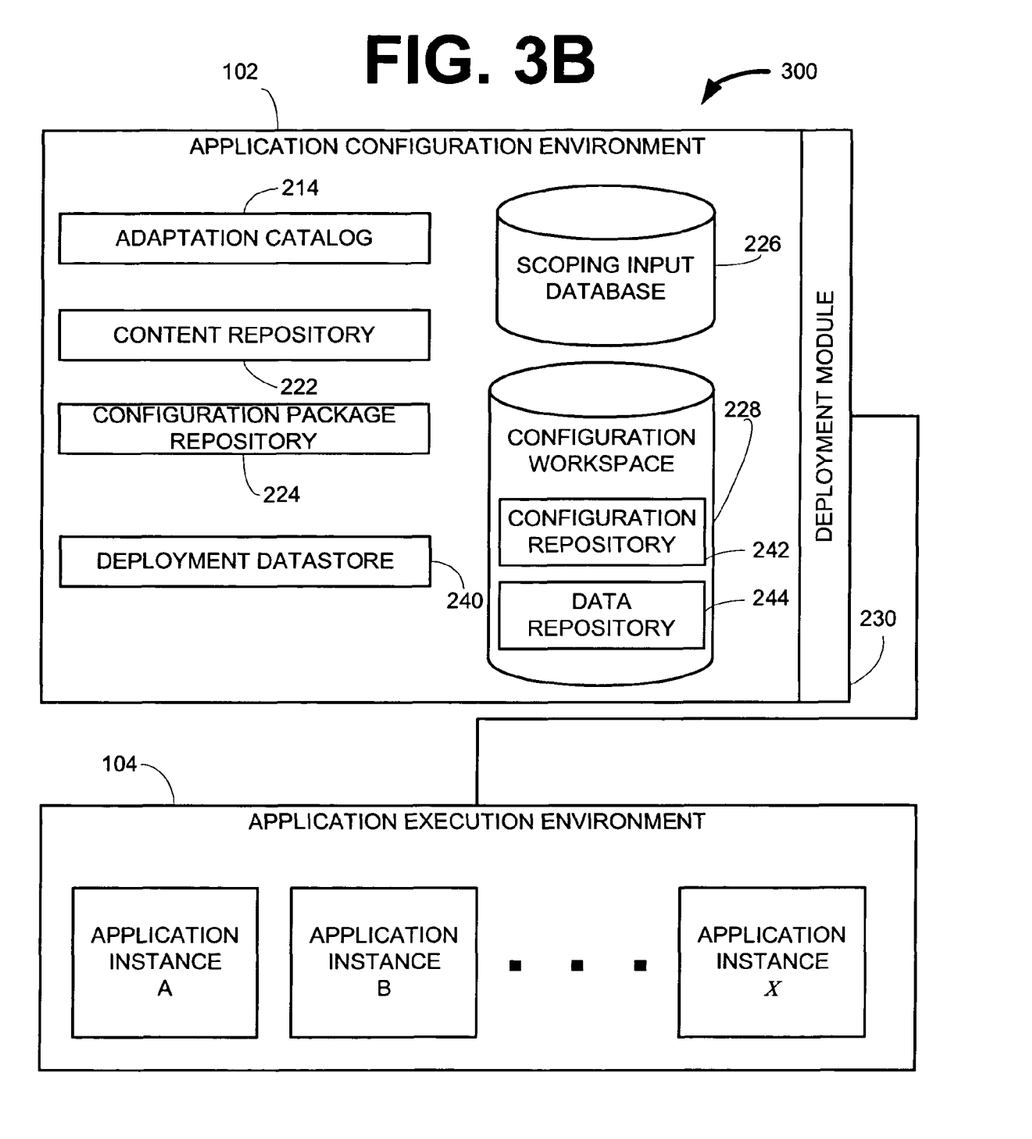
FIG. 3B is a block diagram of a system according to an example embodiment.

FIG. 3B is a block diagram of a system 300 according to an example embodiment. The system 300 includes the application configuration environment 102 as discussed above with regard to FIG. 1, FIG. 2A, FIG. 2B, and FIG. 3A. The system 300 further includes the application execution environment 104.

The application execution environment 104 is a data processing environment within which an application, or an application to be deployed, may execute. When deploying an application, the deployment module 230 typically needs to know what application execution environment 104 and what application instance within that environment to deploy to. In embodiments including only one application execution environment 104, the application execution environment 104 may already be known. Similarly, in an application execution environment including only a single application instance, the instance may already be known.

Each instance of the application (i.e., application instances A, B . . . X) typically includes a set of identical configuration tables which may include distinct configuration settings from one another. In some embodiments, multiple instances of the application may exist such as to provide a development instance, a test instance, and a production instance. In such embodiments where there are multiple application instances, the deployment module 230 may deploy the configuration settings from one of the application instances in the application execution environment 104 to another application in the same or another application execution environment 104. Although the deployment module 230 is illustrated as being a part of the application configuration environment 102, the deployment module 230, in other embodiments, may be a standalone application or a part of another application or process.

Figure 4:
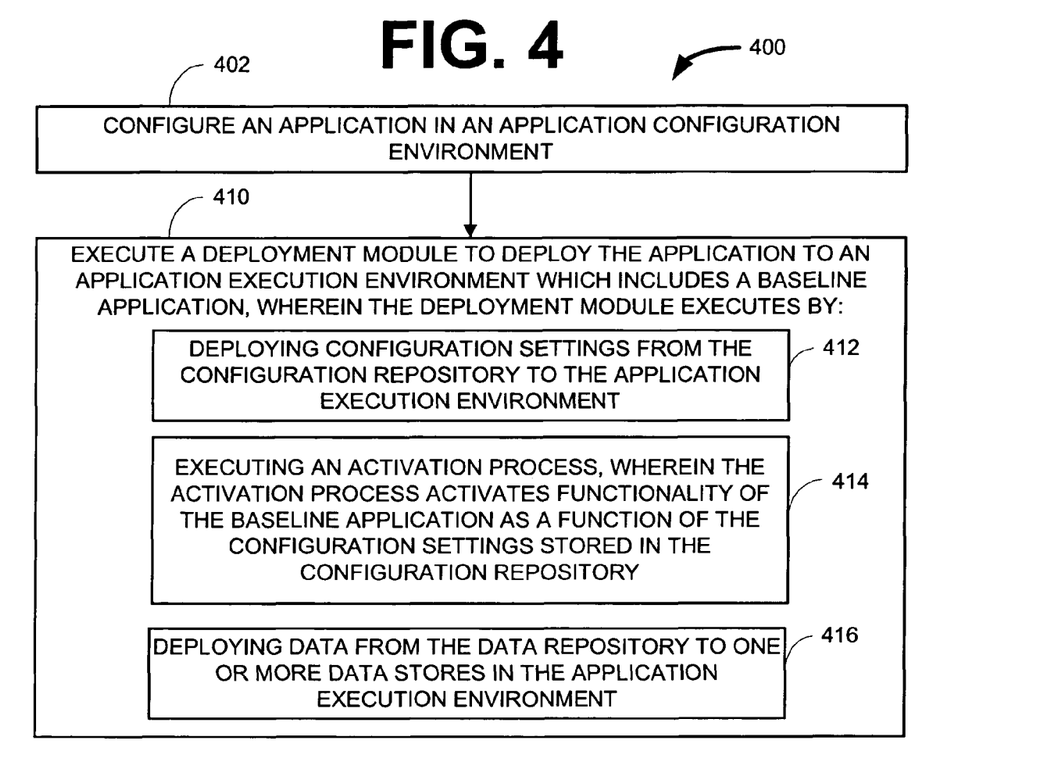
FIG. 4 is a flow diagram of a method according to an example embodiment.

FIG. 4 is a flow diagram of a method 400 according to an example embodiment. In some embodiments, the example method 400 includes configuring an application in an application configuration environment 402 and executing a deployment module to deploy the application to an application execution environment, which includes a baseline application 410. In some embodiments, the deployment module executes by deploying configuration settings from the configuration repository to the application execution environment 412, and executing an activation process, wherein the activation process activates functionality of the baseline application as a function of the configuration settings stored in the configuration repository 414. The deployment module further executes by deploying data from the data repository to one or more data stores in the application execution environment 416.

In some embodiments, the baseline application in the application execution environment includes a plurality of objects. In some such embodiments, the activation process activates functionality of the baseline application by calling an activation method of one or more objects selected by the activation process as a function of the configuration settings stored in the configuration repository.

Some embodiments of the method 400 further include storing, in the application configuration environment, at least a current configuration model of the baseline application. The current configuration model can be used in some embodiments to determine differences between a current state of the baseline application configuration as a function of the current configuration model and a current state of the application configuration environment. Then the configuration setting deployment process, the activation process, and the data deployment process can be executed to deploy only the differences between the current state of the baseline application and the current state of the application configuration environment.

In some embodiments, the deployment module further includes a process to receive deployment commands within the application configuration environment. The deployment commands can include commands identifying portions of an application to deploy and a target application execution environment. The target application execution environment can include a test environment, development environment, production environment, reporting environment, or other environment.

Figure 5:
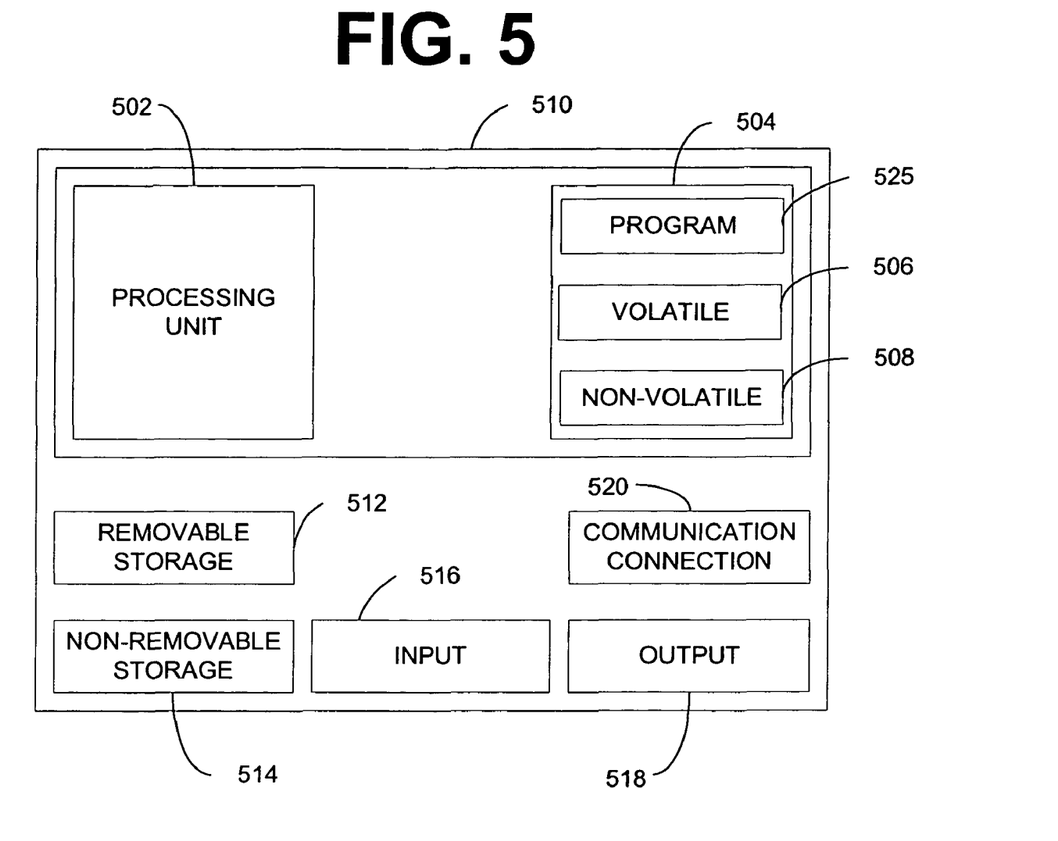
FIG. 5 is a block diagram of a system according to an example embodiment.

FIG. 5 is a block diagram of a computing system according to an example embodiment. In one embodiment, multiple such computer systems are utilized in a distributed network to implement multiple components in a transaction-based environment. An object-oriented architecture may be used to implement such functions and communicate between the multiple systems and components. One example computing device in the form of a computer 510, may include a processing unit 502, memory 504, removable storage 512, and non-removable storage 514. Memory 504 may include volatile memory 506 and non-volatile memory 508. Computer 510 may include—or have access to a computing environment that includes—a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 510 may include or have access to a computing environment that includes input 516, output 518, and a communication connection 520. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 510. A hard drive, CD-ROM, and RAM are some examples of articles including a computer-readable medium. The term "computer readable medium" is also used to represent carrier waves on which the software is transmitted. For example, a computer program 525 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 510 to provide generic access controls in a COM based computer network system having multiple users and servers.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A system comprising:
   an application configuration environment, wherein the application configuration environment includes:
   a configuration repository stored in a memory, wherein the configuration repository includes configuration settings of an application to deploy;
   a data repository stored in the memory, wherein the data repository includes data to be included with the application to deploy; and
   an application execution environment deployment data store, wherein at least a current configuration model of the baseline application is stored therein;
   an application execution environment, wherein the application execution environment includes a baseline application; and a deployment module, wherein the deployment module includes:
- a configuration setting deployment process to deploy configuration settings from the configuration repository to the application execution environment;
- an activation process that executes following execution of the configuration setting deployment process to activate functionality of the baseline application as a function of the configuration settings stored in the configuration repository;
- a data deployment process to deploy data from the data repository to at least one data store in the application execution environment; and
- a delta deployment process, wherein the delta deployment process:
  - determines differences between a current state of the baseline application configuration as a function of the current configuration model and a current state of the application configuration environment; and
  - calls the configuration setting deployment process, activation process, and data deployment process to deploy only the differences between the current state of the baseline application and the current state of the application configuration environment.

2. The system of claim 1, wherein the baseline application in the application execution environment includes a plurality of objects.

3. The system of claim 2, wherein the activation process activates functionality of the baseline application by calling an activation method of at least one object selected by the activation process as a function of the configuration settings stored in the configuration repository.

4. The system of claim 1, wherein the configuration setting deployment process publishes configuration settings directly to at least one configuration table.

5. The system of claim 1, wherein the deployment module further includes a process to receive deployment commands within the application configuration environment, wherein the deployment commands include commands identifying portions of an application to deploy and a target application execution environment.

6. The system of claim 5, wherein the target application execution environment includes a test application execution environment.

7. A method comprising:
- configuring an application in an application configuration environment, wherein the application configuration environment includes:
  - a configuration repository stored in a memory, wherein the configuration repository includes configuration settings of the application; and
  - a data repository stored in the memory, wherein the data repository includes data to be included with the application;
- executing a deployment module to deploy the application to an application execution environment which includes a baseline application, wherein the deployment module executes by:
  - deploying configuration settings from the configuration repository to the application execution environment;
  - executing an activation process subsequent to deployment of the configuration settings to the application execution environment, wherein the activation process activates functionality of the baseline application as a function of the configuration settings stored in the configuration repository; and
  - deploying data from the data repository to at least one data store in the application execution environment;
- storing, in the application configuration environment, at least a current configuration model of the baseline application;
- determining differences between a current state of the baseline application configuration as a function of the current configuration model and a current state of the application configuration environment; and
- executing the configuration setting deployment process, activation process, and data deployment process to deploy only the differences between the current state of the baseline application and the current state of the application configuration environment.

8. The method of claim 7, wherein the baseline application in the application execution environment includes a plurality of objects.

9. The method of claim 8, wherein the activation process activates functionality of the baseline application by calling an activation method of at least one object selected by the activation process as a function of the configuration settings stored in the configuration repository.

10. The method of claim 7, wherein the configuration setting deployment process publishes configuration settings directly to at least one configuration table.

11. The method of claim 7, wherein the deployment module further includes a process to receive deployment commands within the application configuration environment, wherein the deployment commands include commands identifying portions of an application to deploy and a target application execution environment.

12. The method of claim 11, wherein the target application execution environment includes a test application execution environment.

13. A non-transitory machine-readable storage medium, with encoded instructions, which when executed, cause a machine to:
- configure an application in an application configuration environment, wherein the application configuration environment includes:
  - a configuration repository stored in a memory, wherein the configuration repository includes configuration settings of the application; and
  - a data repository stored in the memory, wherein the data repository includes data to be included with the application;
- execute a deployment module to deploy the application to an application execution environment which includes a baseline application, wherein the deployment module executes by:
  - deploying configuration settings from the configuration repository to the application execution environment;
  - executing an activation process subsequent to deployment of the configuration settings to the application execution environment, wherein the activation process activates functionality of the baseline application as a function of the configuration settings stored in the configuration repository; and
  - deploying data from the data repository to at least one data store in the application execution environment;
- store, in the application configuration environment, at least a current configuration model of the baseline application;
- determine differences between a current state of the baseline application configuration as a function of the current configuration model and a current state of the application configuration environment; and execute the configuration setting deployment process, activation process, and data deployment process to deploy only the differences between the current state of the baseline application and the current state of the application configuration environment.

14. The non-transitory machine-readable storage medium of claim 13, wherein the baseline application in the application execution environment includes a plurality of objects.

15. The non-transitory machine-readable storage medium of claim 14, wherein the activation process activates functionality of the baseline application by calling an activation method of at least one object selected by the activation process as a function of the configuration settings stored in the configuration repository.

16. The non-transitory machine-readable storage medium of claim 13, wherein the configuration setting deployment process publishes configuration settings directly to at least one configuration table.

17. The non-transitory machine-readable storage medium of claim 13, wherein the deployment module further includes a process to receive deployment commands within the application configuration environment, wherein the deployment commands include commands identifying portions of an application to deploy and a target application execution environment.

* * * * *